United States Patent [19]

Stavale

[11] Patent Number: 5,392,503
[45] Date of Patent: Feb. 28, 1995

[54] METHOD OF AXIALLY INSTALLING OR REMOVING A MAGNET-CARRIER ASSEMBLY INTO OR FROM A HOUSING

[75] Inventor: Anthony E. Stavale, Cincinnati, Ohio

[73] Assignee: ITT Corporation, New York, N.Y.

[21] Appl. No.: 147,214

[22] Filed: Nov. 3, 1993

[51] Int. Cl.⁶ .......................... B23P 19/00; B23Q 3/00
[52] U.S. Cl. ................................... 29/426.5; 29/426.1;
    29/888.02; 29/888.021; 29/464
[58] Field of Search ................. 29/426.1, 426.2, 426.5,
    29/464, 466, 467, 888.02, 271, 272, 888.021

[56] References Cited

U.S. PATENT DOCUMENTS

| | | | |
|---|---|---|---|
| 4,254,541 | 3/1981 | St. John | 29/464 |
| 4,337,747 | 7/1982 | Jefferson et al. | 29/467 |
| 4,570,320 | 1/1986 | Kile | 29/271 |
| 4,625,385 | 12/1986 | Kohler et al. | 29/464 |
| 4,642,866 | 2/1987 | Murtaugh | 29/426.5 |
| 5,004,017 | 4/1991 | White | 29/464 |

Primary Examiner—Mark Rosenbaum
Assistant Examiner—David P. Bryant
Attorney, Agent, or Firm—M. J. Lombardi

[57] ABSTRACT

Guide rails, projecting axially from a housing section flange, are received in apertures provided therefor in a mating housing section flange, whereby the latter will be concentrically directed, into engagement with the former. Each housing section contains a magnet-carrier assembly which, otherwise, would be magnetically attracted to the other, and occasion damage or injury during assembly or disassembly. The rails prevent radial dislacement of one of the assemblies relative to the other thereof. In addition, jacking screws are interposed between the flanges to insure that magnetically-induced impacting engagement will not occur between the flanges.

3 Claims, 4 Drawing Sheets

5,392,503

METHOD OF AXIALLY INSTALLING OR REMOVING A MAGNET-CARRIER ASSEMBLY INTO OR FROM A HOUSING

BACKGROUND OF THE INVENTION

The assembly or disassembly of sealless magnetic drive pumps, i.e., pumps which have complementary and mutually magnetically-attractive, magnet-carrier assemblies, can prove difficult. This is due to the very high attractive forces which can be created by the magnets of the carrier assemblies. These forces increase significantly with larger magnet drives due to the increased magnet volume used. Current assembly or disassembly practices do not provide a means for keeping the outer magnet-carrier reasonably concentric with the inner magnet-carrier. Some reasonable concentricity is necessary to avoid contact between the outer magnet-carrier assembly and the containment shell, thereby preventing a safety hazard or damage to the equipment.

In current practice, during assembly of the magnet drive end of the pump over the magnet driven end, the drive end, having the outer magnet-carrier assembly, is contacted with the containment shell outer surface, and then is slid forward, into the driven end portion of the housing, until it is fully engaged with the inner, driven end assembly. This practice has serious shortcomings. The magnets are formed of ceramic material and, therefore, are inherently brittle. Any contact between mating parts, during the slidable installation, can cause chipping of the magnets. High magnetic forces are experienced, both radially and axially, when assembling or disassembling the magnet drives. In that containment shells are relatively thin, typically less than one-sixteenth of an inch, damage may occur thereto if the outer magnet-carrier assembly forcefully contacts it. Further, some designs use ceramic or plastic containment shells which, potentially, could crack upon impact. Safety hazards can be created if mating components slam together, during assembly and/or disassembly, trapping and injuring fingers. Also, once the magnet drive end has been assembled to the magnet driven end, the true mating of the rabbet fit, which ultimately aligns the two components concentrically, can be awkward and difficult to effect, due to the radial pull of the inner and outer magnets.

SUMMARY OF THE INVENTION

In view of the foregoing, it is an object of this invention to set forth a method of (a) axially installing or removing one of two, mutually magnetically-attractive, magnet-carrier assemblies, into or from a housing which has the other of said assemblies therein while (b) inhibiting magnetically-induced, radial displacement thereof, comprising the steps of fixing elongate guide means to, and axially projecting from, said housing; providing means in said one assembly for slidably receiving said guide means therein; aligning said receiving means with said guide means; and sliding said receiving means along said guide means.

Too, it is an object of this invention to set forth means for (a) axially installing or removing one of two, mutually magnetically-attractive, magnet-carrier assemblies, into or from a housing which has the other of said assemblies therein, and (b) inhibiting magnetically-induced, radial displacement thereof, comprising a housing having an axis; means fixed to, and projecting axially from, said housing, for guiding said one assembly, axially of said housing, for in-housing installation thereof; and means formed in said one assembly for slidably receiving said guiding means therein.

Further objects of this invention, as well as the novel features and procedures thereof, will become more apparent by reference to the following description, taken in conjunction with the accompanying figures.

DETAILED DESCRIPTION

Figure 1:
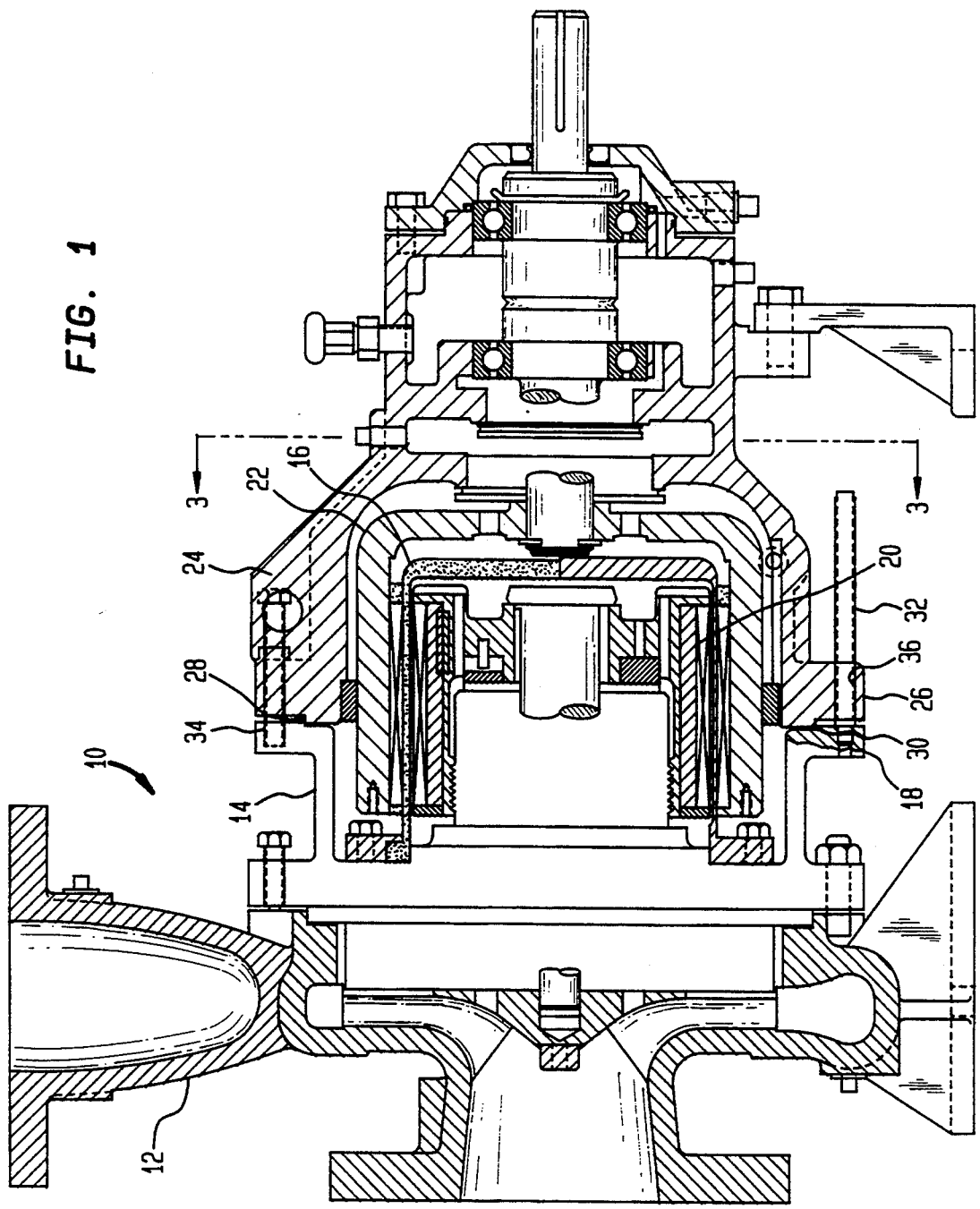
FIG. 1 is a cross-sectional view, taken along the central, longitudinal axis thereof, of a sealless magnetic drive pump, the latter having an embodiment of the invention incorporated therewith.

As shown in FIG. 1, a sealless magnetic drive pump 10, having a volute housing 12, an inner housing section 14, and a containment shell 16 bolted to section 14, has a bearing carrier flange 18 radially extending from housing section 14. The inner magnet-carrier assembly 20 is supported on the housing section 14 within the shell 16. The outer, drive, magnet-carrier assembly 22 has an outer housing section 24 incorporated therewith for mating thereof with the inner housing section 14. Section 24 has a radially extending bearing frame flange 26 formed thereon for mating with flange 18. Flanges 18 and 26 have complementary, shouldered reliefs 28 and 30 formed thereon to define, therebetween, a rabbet fit.

Figure 2:
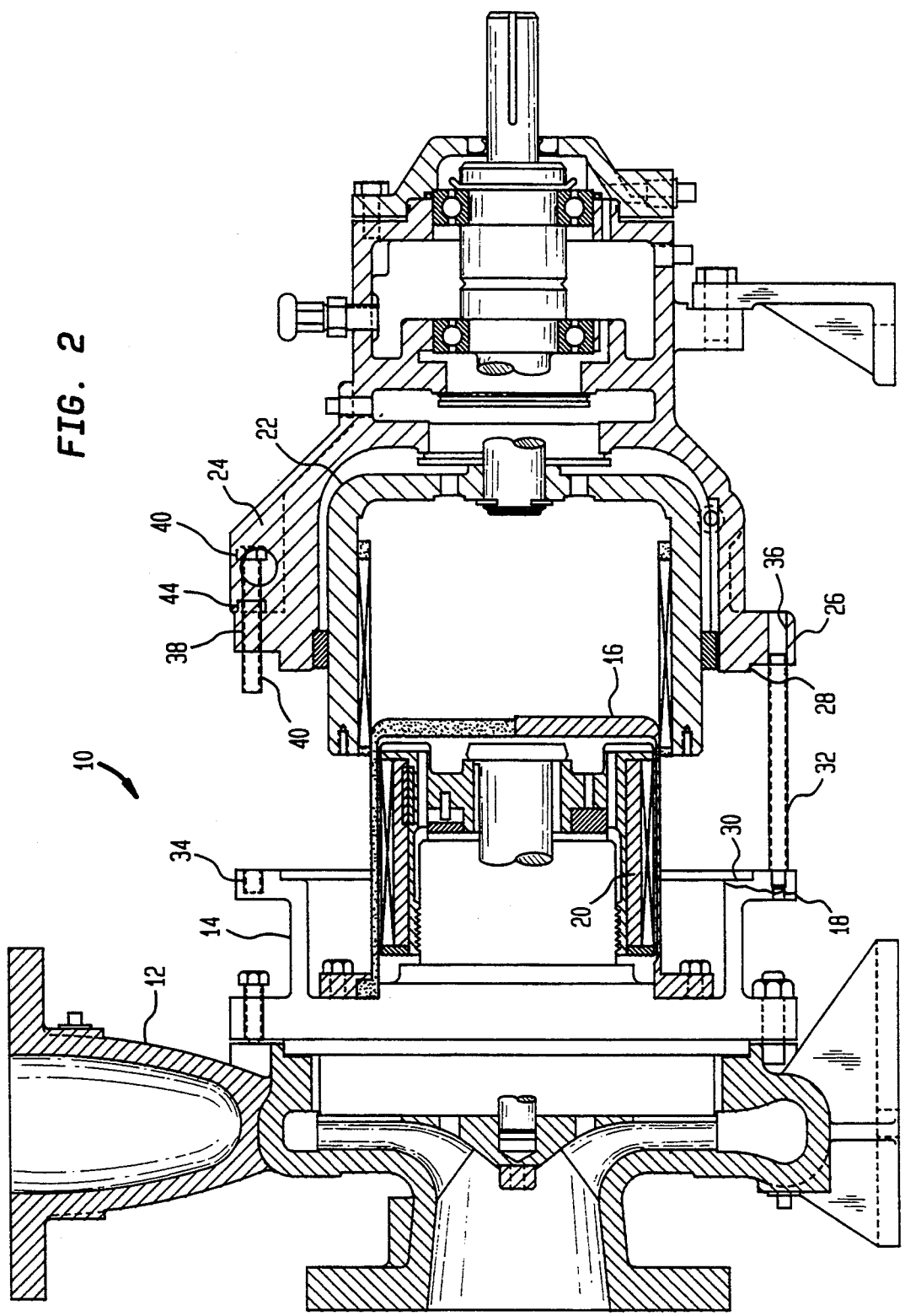
FIG. 2 is a view, like that of FIG. 1, showing the magnet drive end axially displaced during assembly or disassembly of the pump.

Flange 18 has a plurality (three in this embodiment) of guide rails 32 fixed thereto, and extending axially therefrom, as well as tapped bolt holes 34 (twelve in this embodiment). The mating, complementary bearing frame flange 26 has a same three apertures 36 through which to receive the guide rails 32, slidably. FIG. 2 shows the outer assembly 22 axially aligned with the inner housing section 14, and for purposes of illustration FIG. 2 shall be understood to depict an installation of assembly 22. The guide rails 32 have a length sufficient to insure an axial and concentric alignment of assembly 22 with housing section 14 well before the magnets of inner assembly 20 and outer assembly 22 are forceably attractive. Accordingly, upon sliding the assembly 22 axially into or out of housing section 14, it will be surely guided, in concentricity with inner assembly 20, and finely spaced from the containment shell 16.

Figure 3:
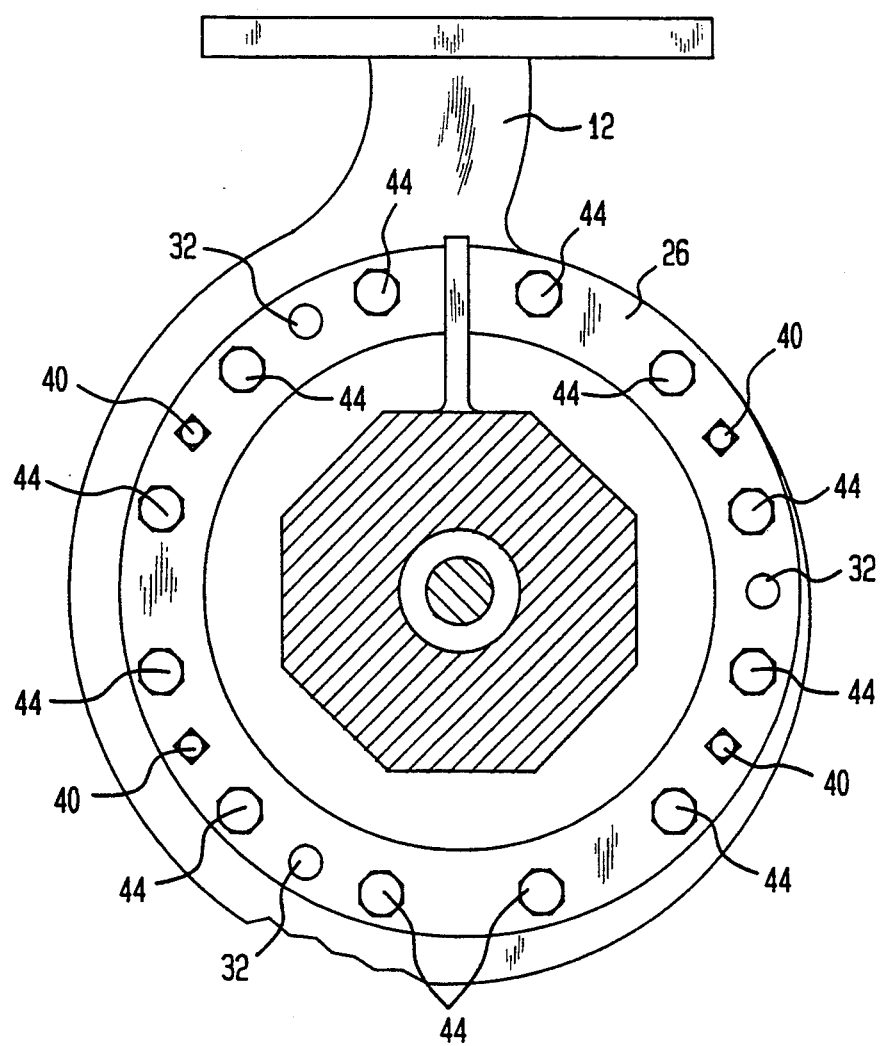
FIG. 3 is a cross-sectional view, taken along section 3—3 of FIG. 1.
Figure 4:
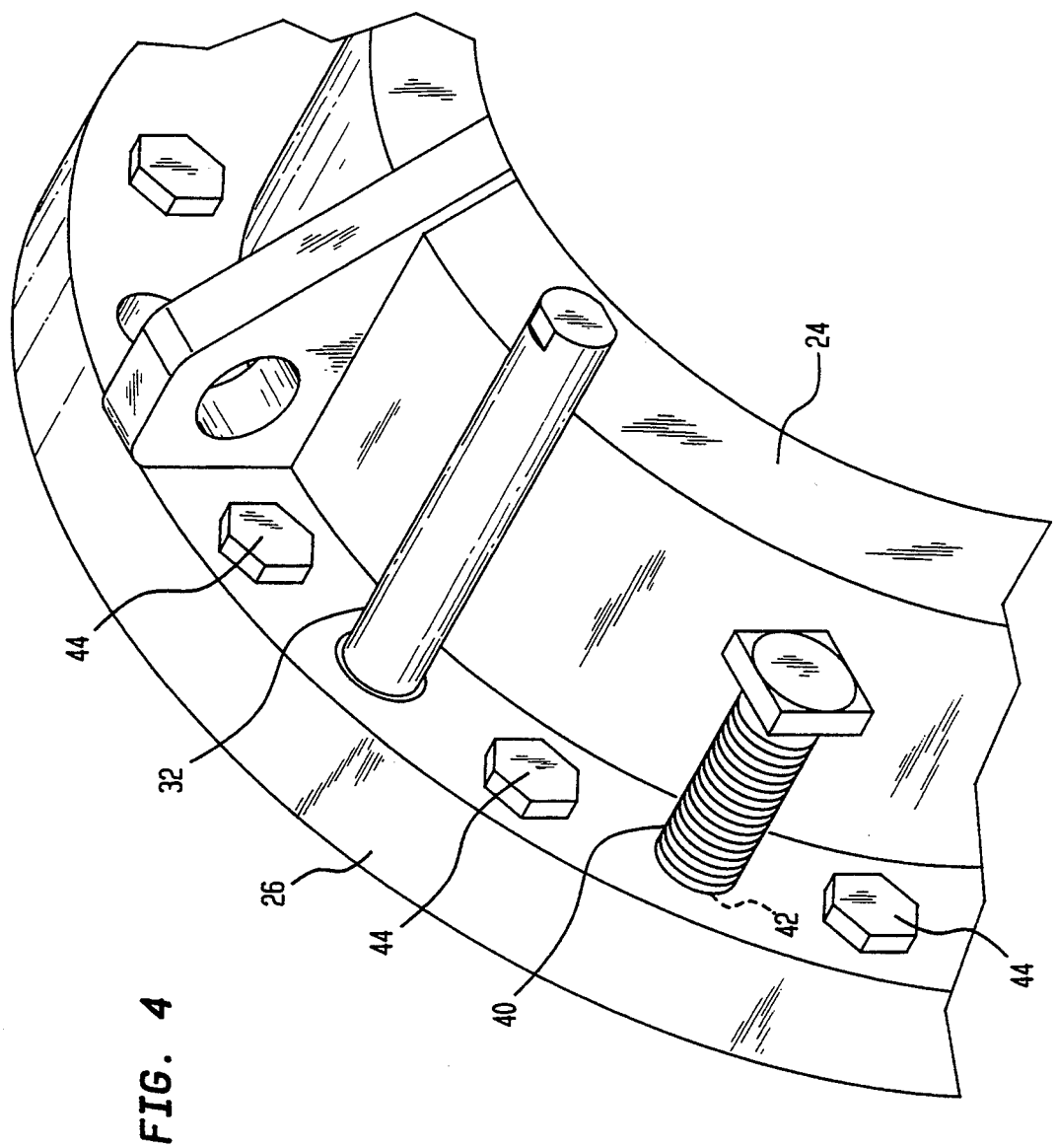
FIG. 4 is a partial perspective view, greatly enlarged over the scale of FIGS. 1 through 3, showing the jacking screws and guide rails of this embodiment of the invention.

As noted earlier, the magnetic attraction inherent in the assemblies 20 and 22 can cause the assembly 22 to slam into engagement with the assembly 20. Hence, a person doing the maintenance assembly can get fingers caught therebetween and experience an injury. Consequently, the invention comprehends means for avoiding such. As can be seen clearly in FIGS. 3 and 4, the bearing frame flange 26 has, in addition to twelve bolt holes 38, and the three apertures 36, a plurality of jacking screws 40 threadedly engaged with tapped holes 42 provided therefor. By threadedly extending the jacking screws 40 into full extension from flange 26, it can be assured that flange 26 will not slam into engagement with flange 18. The jacking screws 40 serve as safety stand-offs to prevent injury to servicing personnel. Gradually, then, the jacking screws 40 can be threadedly retracted, relative to flange 18, to allow the reliefs 28 and 30 to nest properly together. With the reliefs 28 and 30 nested together, into the desired rabbet fit, then bolts 44 are used to fasten together flanges 18 and 26.

While I have described my invention in connection with a specific embodiment thereof, and a given method of practice thereof, it is to be clearly understood that this is done only by way of example, and not as a limitation to the scope of the invention as set forth in the objects thereof and in the appended claims.

I claim:

1. A method of (a) axially installing one of two mutually magnetically-attractive magnet carrier assemblies into a housing which has the other of said assemblies therein, while (b) inhibiting magnetically-induced, radial displacement thereof, said housing and said one assembly having complementary, confrontable flanges, said flange of said one assembly including a plurality of apertures therethrough, said method comprising the steps of:

fixing elongate guide rails to, and axially projecting from, said housing flange;

aligning said apertures in said one flange with said guide rails such that said guide rails are disposed in said apertures;

threadedly installing stand-offs in said one flange such that one end of each stand-off projects from said one flange and extends toward said housing flange, said stand-offs being adjustably extensible and retractable relative to said housing flange; and sliding said one assembly along said guide rails to the extent permitted by said stand-offs, and then gradually threadedly retracting said stand-offs relative to said housing flange until said complementary, confrontable flanges are positioned to effect installation.

2. A method, according to claim 1, wherein said stand-offs comprise jacking screws.

3. A method of (a) axially removing one of two mutually magnetically-attractive magnet carrier assemblies from a housing which has the other of said assemblies therein, while (b) inhibiting magnetically-induced, radial displacement thereof, said housing and said one assembly having complementary, abutting flanges, said flange of said one assembly including a plurality of apertures therethrough, said method comprising the steps of:

inserting elongate guide rails through said apertures in said one flange and fixing said guide rails to said housing flange such that they project therefrom;

threadedly installing stand-offs in said one flange, said stand-offs being adjustably extensible and retractable relative to said housing flange; and threadedly extending said stand-offs relative to said housing flange to effect gradual sliding of said one assembly along said guide rails until said complementary, abutting flanges are spaced apart to effect removal.

* * * * *